United States Patent
Condon et al.

(10) Patent No.: US 12,294,893 B2
(45) Date of Patent: May 6, 2025

(54) METHODS AND SYSTEMS FOR ADJUSTING NETWORK SPEED TO A GATEWAY

(71) Applicant: DISH Network L.L.C., Englewood, CO (US)

(72) Inventors: Caroline Condon, Denver, CO (US); Levi Boscardin, Denver, CO (US); Luke VanDuyn, Conifer, CO (US)

(73) Assignee: DISH Network L.L.C., Englewood, CO (US)

( * ) Notice: Subject to any disclaimer, the term of this patent is extended or adjusted under 35 U.S.C. 154(b) by 24 days.

(21) Appl. No.: 17/862,064

(22) Filed: Jul. 11, 2022

(65) Prior Publication Data

US 2024/0015596 A1 Jan. 11, 2024

(51) Int. Cl.
  *H04W 28/20* (2009.01)
  *H04W 28/08* (2023.01)
  *H04W 28/12* (2009.01)

(52) U.S. Cl.
  CPC ....... *H04W 28/20* (2013.01); *H04W 28/0983* (2020.05); *H04W 28/12* (2013.01)

(58) Field of Classification Search
  CPC .. H04W 28/20; H04W 28/0983; H04W 28/12
  See application file for complete search history.

(56) References Cited

U.S. PATENT DOCUMENTS

| | | | |
|---|---|---|---|
| 10,270,834 B2* | 4/2019 | Dao | H04L 65/752 |
| 10,523,570 B2* | 12/2019 | Iyer | H04L 41/40 |
| 2004/0267503 A1* | 12/2004 | Batterberry | H04L 65/752 |
| | | | 702/188 |
| 2006/0153201 A1* | 7/2006 | Hepper | H04L 47/10 |
| | | | 370/395.42 |
| 2010/0299236 A1* | 11/2010 | Cassell | H04L 67/1097 |
| | | | 709/233 |
| 2021/0211937 A1* | 7/2021 | Qu | H04L 1/1642 |
| 2022/0321470 A1* | 10/2022 | Qian | H04L 45/16 |

* cited by examiner

*Primary Examiner* — Luat Phung
(74) *Attorney, Agent, or Firm* — Perkins Coie LLP

(57) ABSTRACT

The present disclosure is directed to methods and systems for adjusting network speed to a gateway. The network speed adjustment system can include a gateway with the ability to manage a consumer-initiated temporary increase in network speed or network bandwidth. The network speed adjustment system can determine whether the provisioning system can support a network speed increase to the gateway. The provisioning system can measure the capacity of the network at the gateway location and determine whether the system can support providing the gateway with an increased network speed or increased bandwidth. When additional bandwidth capacity or network speed is available for a gateway location, a user can request the network increase by submitting a token via the gateway. The gateway can communicate with the provisioning system to increase the network speed according to the characteristics of the token.

20 Claims, 6 Drawing Sheets

METHODS AND SYSTEMS FOR ADJUSTING NETWORK SPEED TO A GATEWAY

BACKGROUND

In some cases, many consumers have a weak understanding of the relationship between their internet package subscription speed and the way internet-based applications and services work on their devices. This leads to frustration when they are under-subscribed and their internet speed to too slow to perform a task, such as a video call.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
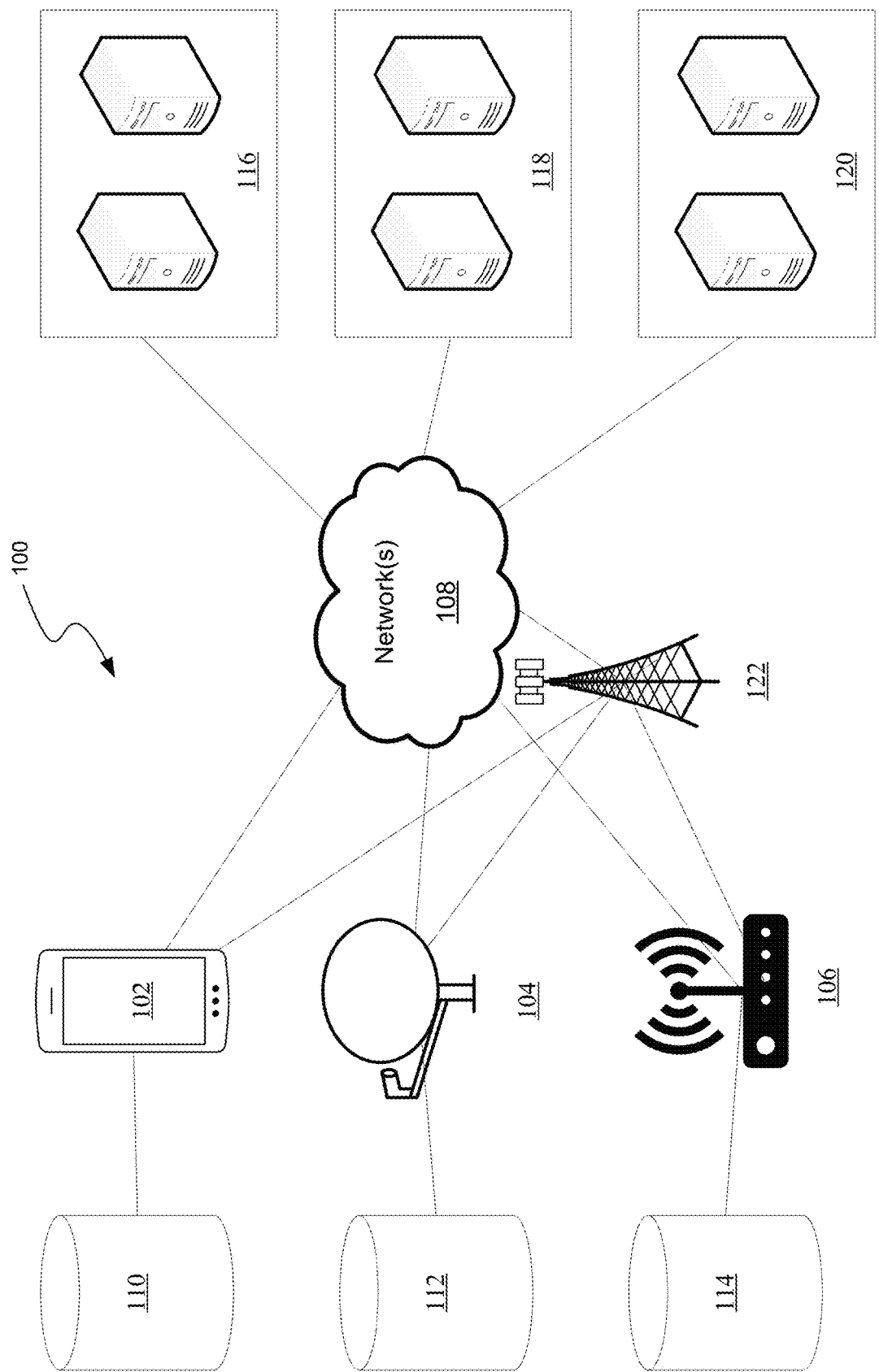
FIG. 1 illustrates an example of a distributed system for adjusting network speed to a gateway.

Aspects of the present disclosure are directed to methods and systems for adjusting network speed to a gateway. The network speed adjustment system can include a gateway (e.g., router and modem functionality, or router and Optical Network Termination (ONT) for fiber connections) with the ability to support a consumer-initiated temporary increase in network speed (e.g., data transfer rate) or bandwidth (e.g., volume of data). The network speed adjustment system can determine whether the provisioning system can support a network speed increase to a gateway. The provisioning system can measure the capacity of the network at user locations and determine whether the system can support providing a gateway with an increased network speed and/or increased bandwidth. When additional bandwidth capacity and network speed is available for a gateway location, the network speed adjustment system can send a notification to a user interface to alert a user of the ability to increase their network speed. The notification can include a token(s) (e.g., secure confirmation code, keyword, identifier, symbol, authenticator, etc.). The token can include characteristics which indicate the network speed (e.g., 200 Mbps), duration of speed increase (e.g., 30 minutes, 1 hour, 2 days, etc.), and time of usage (e.g., time of day, such as after 6 PM, weekdays, etc.).

A user can initiate the network speed adjustment by submitting a token to the network provider. After the user submits the token, the gateway can communicate with the provisioning system to increase the network speed according to the characteristics of the token. The user can receive a notification (e.g., message, icon, audio alert, visual alert, etc.) on the gateway or user interface indicating when the speed increase begins and when the increase is expiring. When the network speed increase expires, users can be offered the opportunity to upgrade permanently to the increased speed. Having just experienced it, they will have a better understanding of what the increased speed will be like for their actual use cases and will be more likely to be satisfied with their decision. In some implementations, a user can request a decreased or increased network speed to determine whether they want a different internet package provided to their gateway.

Methods and systems disclosed herein can provide technical advantages over conventional systems. Currently, satellite internet systems only add data capacity based on a customer request and do not confirm whether the user receives a network speed increase. The disclosed network speed adjustment system provides: 1) the ability to support a temporary increase in network speed/bandwidth; 2) the ability for the user to initiate the network speed/bandwidth adjustment (e.g., increase or decrease) via an application without involvement of a customer service representative; 3) the ability to increase or decrease network speed/bandwidth for a task; 4) the ability to dynamically adjust the speed/bandwidth for a customer; 5) the ability to measure the available network capacity and determine whether the system can provide an increased speed/bandwidth to a user; and 6) the ability to make a network speed/bandwidth increase suggestion to a user based on the measured network capacity. It is understood that a speed increase described herein can refer to an increase in network speed and/or an increase in network bandwidth to a gateway.

FIG. 1 illustrates an example of a distributed system for adjusting network speed to a gateway. Example system 100 presented is a combination of interdependent components that interact to form an integrated whole for adjusting the network speed at a gateway. Components of the systems may be hardware components or software implemented on, and/or executed by, hardware components of the systems. For example, system 100 comprises client devices 102, 104, and 106, local databases 110, 112, and 114, network(s) 108, and server devices 116, 118, and/or 120.

Client devices 102, 104, and 106 may be configured to support initiating an adjustment to the network speed at a gateway. In one example, a client device 102 may be a mobile phone, a client device 104 may be a smart OTA antenna, and a client device 106 may be a broadcast module box (e.g., set-top box). In other example aspects, client device 106 may be a gateway device (e.g., router) that is in communication with sources, such as ISPs, cable networks, internet providers, or satellite networks. Other possible client devices include but are not limited to tablets, personal computers, televisions, etc. In aspects, a client device, such as client devices 102, 104, and 106, may have access to a networks from a gateway. In other aspects, client devices 102, 104, and 106, may be equipped to receive data from a gateway. The signals that client devices 102, 104, and 106 may receive may be transmitted from satellite broadcast tower 122. Broadcast tower 122 may also be configured to communicate with network(s) 108, in addition to being able to communicate directly with client devices 102, 104, and 106. In some examples, a client device may be a set-top box that is connected to a display device, such as a television (or a television that may have set-top box circuitry built into the television mainframe).

Client devices 102, 104, and 106 may be configured to run software that measures the network speed, generates a token (e.g., secure confirmation code), sends the token to a provisioning system, and receives an increased network speed. Client devices 102, 104, and 106 may access content data through the networks. The content data may be stored locally on the client device or run remotely via network(s) 108. For example, a client device may receive a signal from broadcast tower 122 containing content data. The signal may indicate user requested media content. The client device may receive this user requested content data and subsequently store this data locally in databases 110, 112, and/or 114. In alternative scenarios, the user requested content data may be transmitted from a client device (e.g., client device 102, 104, and/or 106) via network(s) 108 to be stored remotely on server(s) 116, 118, and/or 120. A user may subsequently access the media content data from a local database (110, 112, and/or 114) and/or external database (116, 118, and/or 120), depending on where the media content data may be stored. The system may be configured to receive and process user requested content data in the background.

In some example aspects, client devices 102, 104, and/or 106 may be equipped to receive signals from an input device. Signals may be received on client devices 102, 104, and/or 106 via Bluetooth, Wi-Fi, infrared, light signals, binary, among other mediums and protocols for transmitting/receiving signals. For example, a user may use a mobile device 102 to check for the content data from a channel from an OTA antenna (e.g., antenna 104). A graphical user interface may display on the mobile device 102 the requested content data. Specifically, at a particular geolocation, the antenna 104 may receive signals from broadcast tower 122. The antenna 104 may then transmit those signals for analysis via network(s) 108. The results of the analysis may then be displayed on mobile device 102 via network(s) 108. In other examples, the results of the analysis may be displayed on a television device connected to a broadcast module box, such as broadcast module box 106.

In other examples, databases stored on remote servers 116, 118, and 120 may be utilized to assist the system in providing content to a user from a gateway at an increased or decreased network speed. Such databases may contain certain content data such as video titles, actors in movies, video genres, etc. Such data may be transmitted via network(s) 108 to client devices 102, 104, and/or 106 to assist in identifying user requested media content. Because broadcast tower 122 and network(s) 108 are configured to communicate with one another, the systems and methods described herein may be able to identify requested media content in different sources, such as streaming services, local and cloud storage, cable, satellite, or OTA.

Figure 2:
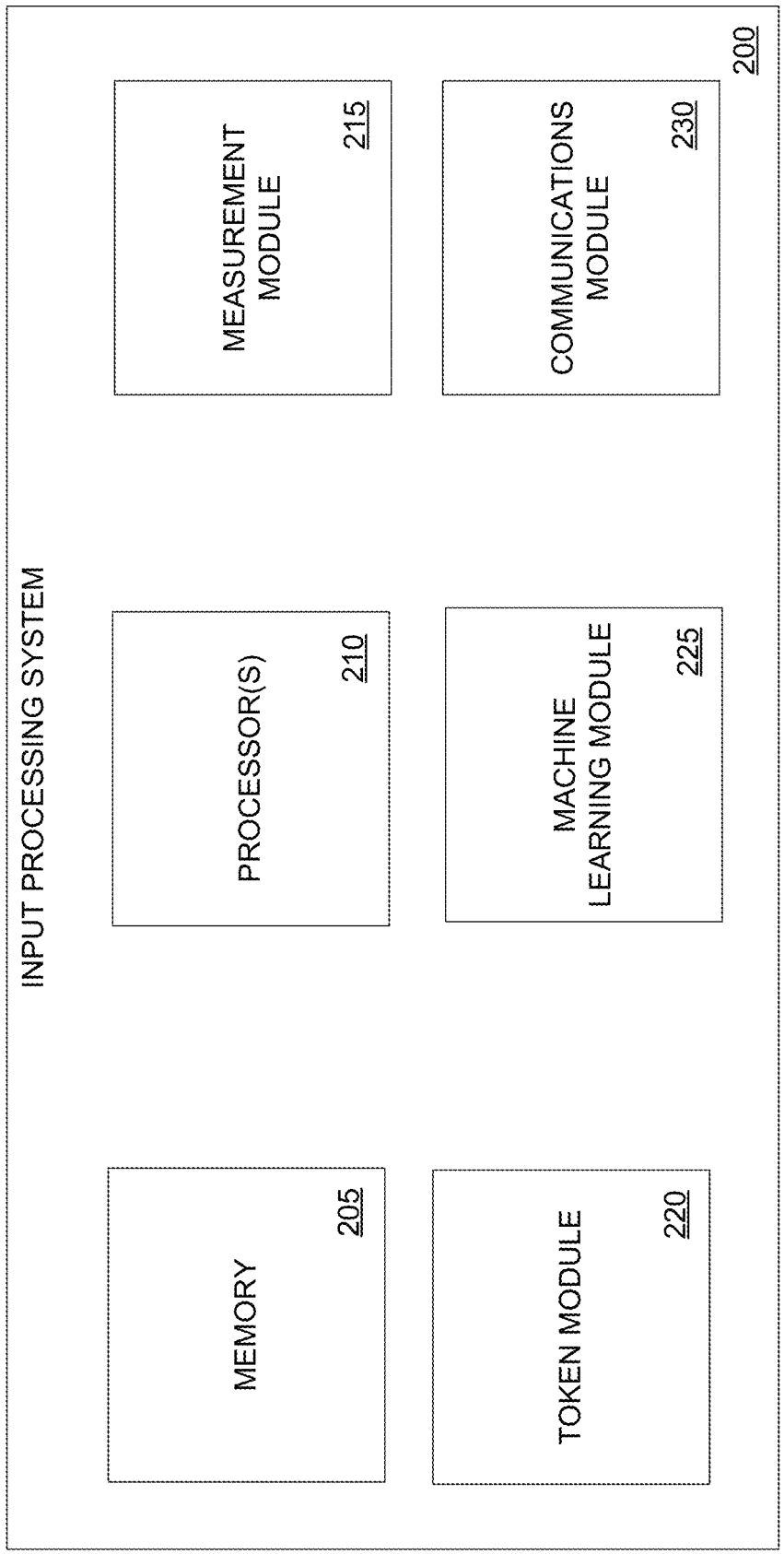
FIG. 2 illustrates an example input processing system for implementing systems and methods for adjusting network speed to a gateway.

FIG. 2 illustrates an example input processing system for implementing systems and methods for adjusting network speed to a gateway. The input processing system (e.g., one or more data processors) is capable of executing algorithms, software routines, and/or instructions based on processing data provided by a variety of sources related to measuring the network speed, generating a token (e.g., secure confirmation code), sending the token to a provisioning system, and receiving an increased network speed. The input processing system can be a general-purpose computer or a dedicated, special-purpose computer. According to the embodiments shown in FIG. 2, the disclosed system can include memory 205, one or more processors 210, measurement module 215, token module 220, machine learning module 225, and communications module 230. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of measurement module 215, token module 220, machine learning module 225, and communications module 230. Generally, memory 205 can include any device, mechanism, or populated data structure used for storing information. In accordance with some embodiments of the present disclosures, memory 205 can encompass, but is not limited to, any type of volatile memory, nonvolatile memory, and dynamic memory. For example, memory 205 can be random access memory, memory storage devices, optical memory devices, magnetic media, floppy disks, magnetic tapes, hard drives, SIMMs, SDRAM, RDRAM, DDR, RAM, SODIMMs, EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205. In some example aspects, memory 205 may store at least one database containing the customizable features of the networks, a prioritized order of the networks, or user requested content information, such as audio or video data.

Measurement module 215 may be configured to measure the capacity of the network at gateway locations and determine whether the system can support providing the gateway with an increased network speed or with increased bandwidth. In some implementations, the measurement module 215 communicates with the provisioning system to determine if a speed/bandwidth adjustment is possible at the location of the gateway. The measurement module 215 can determine what network speeds or bandwidth are available at the gateway location, the duration of speed/bandwidth increase (e.g., 30 minutes, 1 hour, 2 days, etc.), and the time the speed/bandwidth increase is available (e.g., time of day, such as after 6 PM, weekdays, etc.). For example, at a gateway location, a speed increase is available between the hours of 9 PM and 6 AM when the network has the capacity to support the increase.

Token module 220 may be configured to generate tokens based on the ability of the network to provide an increase in speed or bandwidth to the gateway. Each token can include characteristics which indicate the network speed (e.g., 200 Mbps), network bandwidth (e.g., 25 Mbps), duration of the speed increase (e.g., 30 minutes, 1 hour, 2 days, etc.), and the time (e.g., time of day, such as after 6 PM, weekdays, etc.) the speed/bandwidth increase is available to the user. For example, a first token is for a network speed of 50 Mbps while a second token is for a network speed of 100 Mbps. When a user initiates a speed/bandwidth increase, the token module 220 can generate a token and send the token to the provisioning system to automatically receive authorization for the increase network speed/bandwidth.

Machine learning module 225 may be configured to analyze gateway settings to determine whether to request a network speed/bandwidth adjustment (increase or decrease) based on a network measurement at the gateway. The machine learning module 225 may be configured to request a network speed/bandwidth adjustment based on at least one machine-learning algorithm trained on at least one dataset reflecting a user requesting a network speed/bandwidth adjustment. The at least one machine-learning algorithms (and models) may be stored locally at databases and/or externally at databases (e.g., cloud databases and/or cloud servers). Client devices may be equipped to access these machine learning algorithms and intelligently identify user preferences, such as the customizable features, and determine whether to request a network speed/bandwidth adjustment based on at least one machine-learning model that is trained on a user's historical network speed/bandwidth history. For example, if a user frequently requests a speed/bandwidth increase for a task (e.g., video calls, playing video games, streaming sporting events, etc.), the user's network speed/bandwidth history may be collected to train a machine-learning model to automatically request a network speed/bandwidth increase when the user performs the task.

As described herein, a machine-learning (ML) model may refer to a predictive or statistical utility or program that may be used to determine a probability distribution over one or more character sequences, classes, objects, result sets or events, and/or to predict a response value from one or more predictors. A model may be based on, or incorporate, one or more rule sets, machine learning, a neural network, or the like. In examples, the ML models may be located on the client device, service device, a network appliance (e.g., a firewall, a router, etc.), or some combination thereof. The ML models may process user network speed/bandwidth history and other data stores of user preferences (e.g., surveys, user profile settings, etc.) to determine when to request a network speed/bandwidth adjustment at a gateway. Based on an aggregation of data from a user's network speed/bandwidth history, user profiles, gateway settings, network settings, network capability, and other user data stores, at least one ML model may be trained and subsequently deployed to automatically determine when to request a network speed/bandwidth adjustment at a gateway. The trained ML model may be deployed to one or more devices. As a specific example, an instance of a trained ML model may be deployed to a server device and to a client device. The ML model deployed to a server device may be configured to be used by the client device when, for example, the client device is connected to the internet. Conversely, the ML model deployed to a client device may be configured to be used by the client device when, for example, the client device is not connected to the internet. In some instances, a client device may not be connected to the internet but still configured to receive satellite signals with multimedia information and channel guides. In such examples, the ML model may be locally cached by the client device.

Communications module 230 is associated with sending/receiving information (e.g., measurement module 215, token module 220, and machine learning module 225) with a remote server or with one or more client devices, streaming devices, routers, OTA boxes, set-top boxes, etc. These communications can employ any suitable type of technology, such as Bluetooth, WiFi, WiMax, cellular, single hop communication, multi-hop communication, Dedicated Short Range Communications (DSRC), or a proprietary communication protocol. In some embodiments, communications module 230 sends measurement information identified by the measurement module 215 and information identified by the token module 220. Furthermore, communications module 230 may be configured to communicate content data to a client device and/or OTA box, router, smart OTA antenna, and/or smart TV, etc.

Figure 3:
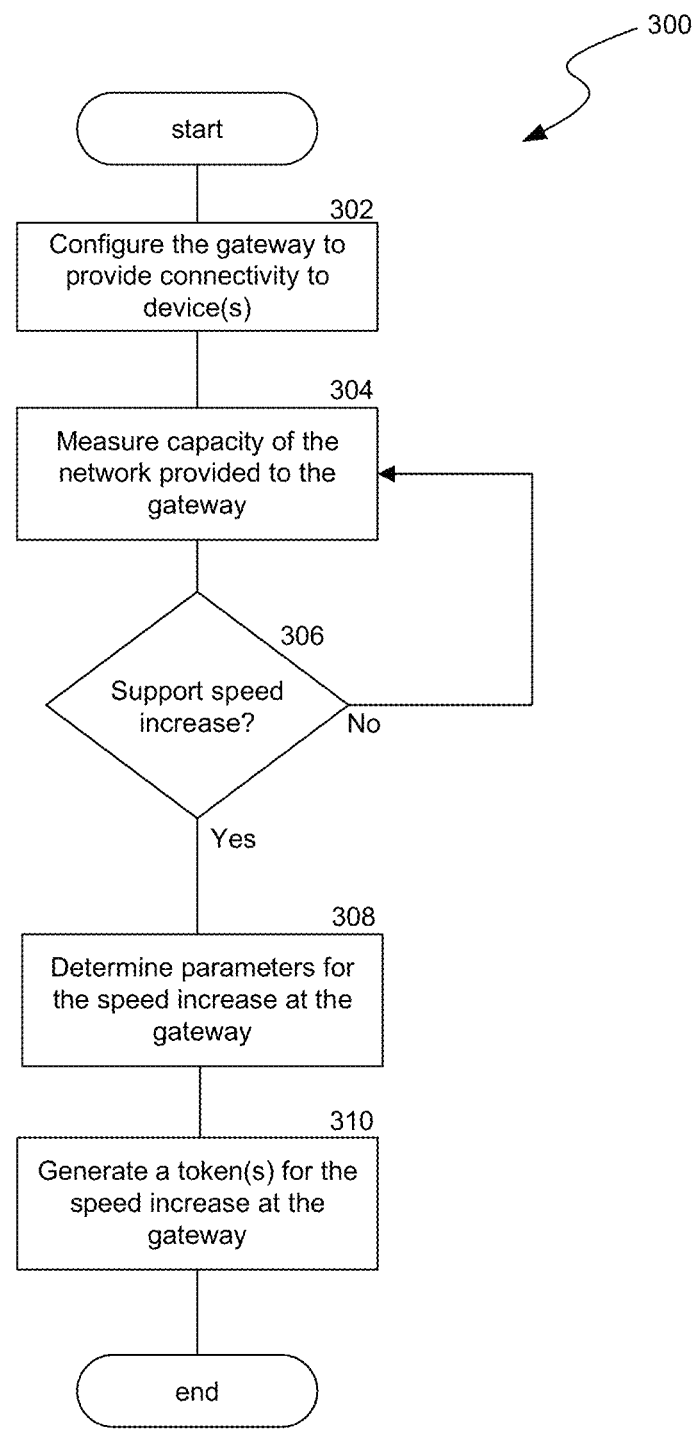
FIG. 3 is a flow diagram illustrating a process used in some implementations for identifying a network speed adjustment capability to a gateway.

FIG. 3 is a flow diagram illustrating a process 300 used in some implementations for identifying a network speed adjustment capability to a gateway. In some implementations, process 300 is triggered by a user activating a subscription for network speed adjustment, powering on a device, a device connecting to a gateway (e.g., router), powering on the gateway, the gateway connecting to a source (e.g., ISP, cable network, satellite network, etc.), the gateway sending a token to the provisioning system, a user device sending a token to the provisioning system, or the user downloading an application on a device for adjusting network speed. In various implementations, process 300 is performed locally on the user device or performed by cloud-based device(s) that can provide/support adjusting the network speed to a gateway.

At block 302, process 300 connects a gateway to a source (provisioning system) and provides network connectivity to the gateway. Process 300 can determine the number of devices to receive network connectivity from the gateway. The gateway can provide the devices with a network speed/bandwidth that is supplied by the provisioning system. A user can select gateway settings on the gateway device, such as on a user interface screen or buttons on the gateway device, or the user can input settings in an application on a user device, such as a smart phone or tablet. When registering or activating the gateway, the user can provide access information (e.g., passwords, usernames, biometrics, etc.), user preferences, or security settings.

At block 304, process 300 measures the capacity of the network provided to the gateway. Process 300 can determine what network speeds or bandwidth the system is capable to provide to the gateway. For example, due to the location of broadcast towers and network utilization, the system is limited to providing network speed/bandwidth below a threshold to the gateway. Process 300 can identify locations with underutilized network capability and identify times to provide faster network speeds during periods of low congestion. For example, the system can provide a speed/bandwidth increase between 9 PM and 6 AM when fewer customers are utilizing the network. In some implementations, based on the network measurements, process 300 can identify locations to install broadcast towers to increase the speed/bandwidth to a coverage area.

For a mobile/cellular network (i.e., if the customer's home internet is fixed wireless access (FWA)), the system can check for capacity at the tower in real time, in addition to following generalized rules based on past capacity. For example, if a tower typically has excess capacity after 9 pm, process 300 sends a user a token they can only use after 9 pm. When the user uses the token, the provisioning system can verify in real-time there is adequate capacity to provide the speed increase. In some implementations, process 300 can perform a query against a fixed database of possible speeds to identify available network speeds that a customer can request at their gateway location. Process 300 can in real-time determine if a network speed increase is available by checking against usage on shared network infrastructure (e.g., residential fiber & cable connections) by tapping into the ISP's neighborhood/semi-local connection hub (e.g., DSLAM).

Process 300 can identify the capability of the equipment at the user location. For example, if a modem or router of a user only supports 200 Mbps speeds, even if the network can support 500 Mbps, the user is unable to receive an upgrade to 500 Mbps. Process 300 can measure the actual throughput to the gateway or to the end-user device. Even if the network has capacity to support an additional user at 500 Mbps, there may be connectivity issues (potentially physical) to the gateway or end-user device. For example, faulty wiring within a customer house may limit the speed a customer can experience, such as a customer is provisioned for 200 Mbps, but the faulty wiring only permits the user to experience 100 Mbps at the gateway. In some cases, the gateway measures a network speed (e.g., 200 Mbps) into the gateway, but distribution to devices is limited to a lower speed (e.g., 100 Mbps). Identifying what network speed the end-user device can receive prior to an increase can identify what network speed process 300 can increase the an end-user to.

At block 306, process 300 determines whether the system can support a network speed/bandwidth increase to the gateway. Process 300 can determine whether the system can support a speed/bandwidth increase based on the measurements of the utilization of the network supplying the gateway with connectivity and the speed/bandwidth capability of the system providing the network to the gateway. In a first example, when the current utilization of the network supplying connectivity to the gateway is above a threshold capability of the system, the system is unable to provide a network speed/bandwidth increase to the gateway. If the system is unable to provide a network speed/bandwidth increase to the gateway, at block 304, process 300 continues to measure the capacity of the network provided to the gateway. In a second example, when the current utilization of the network supplying connectivity to the gateway is below a threshold capability of the system, the system can provide a network speed/bandwidth increase to the gateway.

If the system can support a network speed/bandwidth increase to the gateway, at block 308, process 300 determines the parameters for the network speed/bandwidth increase to the gateway based on the measurements of the utilization of the network and the speed/bandwidth capability of the system. The parameters can include the available speed/bandwidth increase, the task (e.g., downloading a file) the duration of speed/bandwidth increase (e.g., 30 minutes, 1 hour, 2 days, etc.), and/or the time the speed/bandwidth increase is available (e.g., time of day, such as after 6 PM, weekdays, etc.). For example, at a gateway location, a speed increase is available after 9 PM when the utilization is the below a threshold.

At block 310, process 300 generates a token(s) for each available speed/bandwidth increase based on the determined parameters. For example, a first token is for a network speed of 100 Mbps for a duration of 30 minutes while a second token is for a network speed of 200 Mbps between the hours of 9 PM and 6 AM. Process 300 can send a notification to an application on a user interface to alert the user of available tokens and the ability for network speed/bandwidth increase. In some implementations, when a gateway determines a user device is experiencing buffering/delays while a user is performing a task (e.g., video call, video streaming, downloading, etc.), process 300 can notify the user of the speed/bandwidth increase.

In some implementations, the tokens include task-based parameters to provide a network speed/bandwidth increase until a task is completed. For example, the speed/bandwidth increase remains until a particular download has finished or until a particular video call has finished. Process 300 can monitor the duration of the task and implement a backup time-dependent expiration criteria to prevent misuse. Process 300 can allow the user to complete a specific task on the faster speed, with flexibility about exactly how long it takes.

In a first example, process 300 provides the network speed/bandwidth increase for a task (e.g., video call) but if the video call exceeds a threshold (e.g., 30 minutes, 1 hour, 2 hours, etc.), process 300 ends the speed increase. In a second example, a holiday promotion allows a user to experience what video calls are like on gigabit speeds by providing tokens that activate during the holiday. The underlying token can monitor for traffic to/from known video call servers (e.g., Google Meets™ Zoom™, etc.), and terminates the speed increase when the traffic to the video call server has entirely dropped off, indicating the user finished their call. This is an easier value proposition for the user to understand and keep track of (i.e., "make one high-speed call" instead of "call for exactly 30 minutes"). In a third example, process 300 provides tokens customers to fix customer problems in the case something goes wrong with their internet. For example, a customer calls the help line of the internet provider to indicate their internet dropped before they finished a large game download (e.g., 100 GB). To make things right, the internet provider can give the customer temporarily faster speeds, so the customer does not have to wait as long for the download again. Process 300 monitors from the gateway to identify when the download is complete and ends the speed, instead of estimating how long the download will take.

In some implementations, the tokens include service-based parameters for the network speed/bandwidth increase. For example, a user requests the speed increase for a particular application (e.g., when using Netflix™ to watch 4K movies) but the user does not need the speed increase at other times. Process 300 can generate a token for a speed/bandwidth increase the user's particular service. The provisioning system or gateway can identify and prioritize services, for example provide a first speed (e.g., 100 Mbps) for Service A but a second speed (e.g., 500 Mbps) for Service B.

A user can purchase or receive tokens from the network provider as part of their network subscription and add the tokens to their user account for immediate of future use. In some cases, a network provider can supply tokens to customers to resolve customer complaints after an outage (e.g., if a customer experiences an outage in the middle of a large download, the network provider could grant them extra speed-up tokens, to allow them to finish the download as quickly as possible when service is restored). In some cases, the network provider can supply tokens to users to encourage the user to try out faster speeds during periods of low congestion or on underutilized networks (e.g., a bonus tokens for a speed-increase could be targeted to customers receiving service on underutilized towers). Unused tokens can remain available or expire after a period (e.g., day, month, year, etc.).

Figure 4:
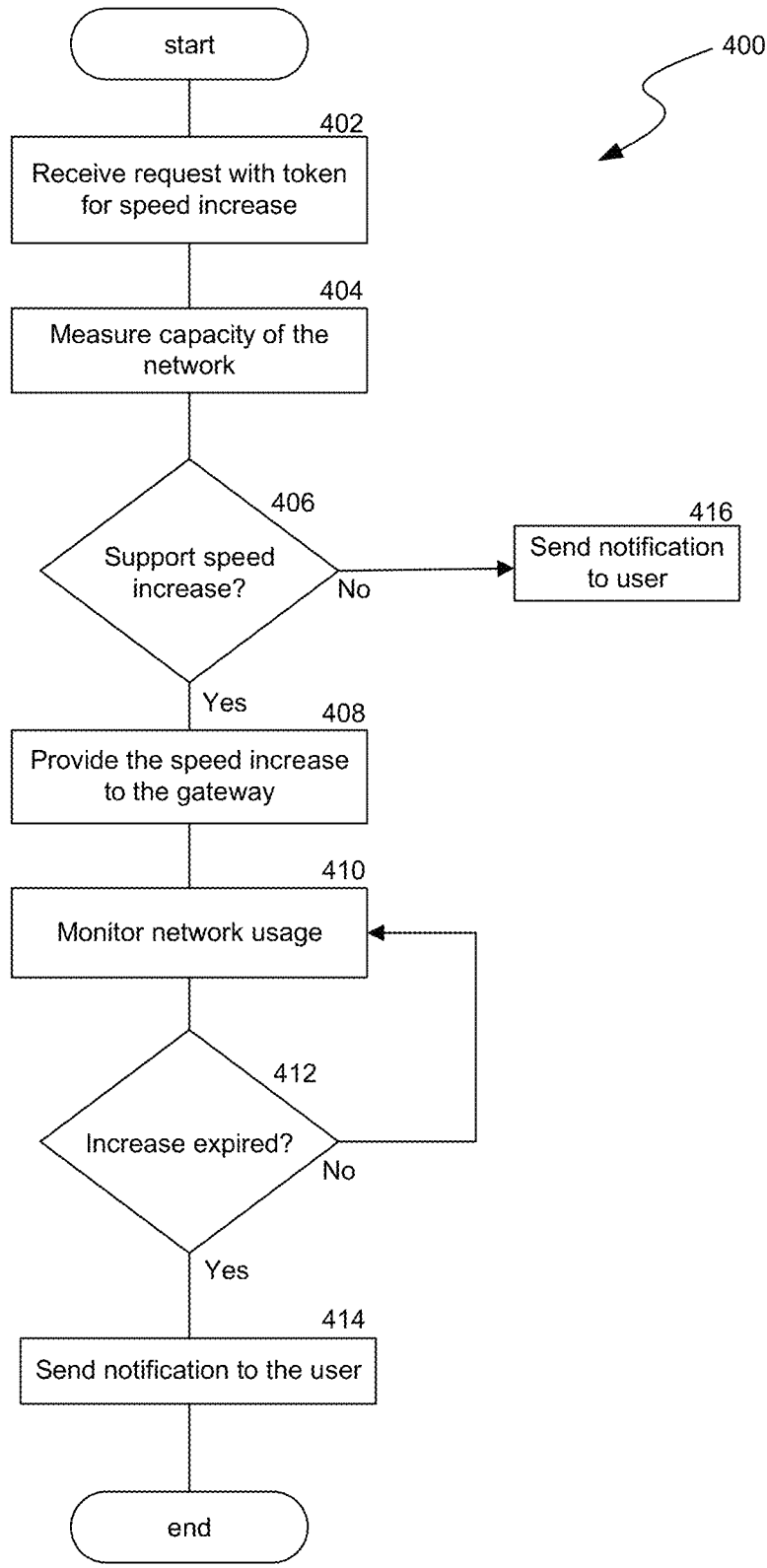
FIG. 4 is a flow diagram illustrating a process used in some implementations for adjusting the network speed to a gateway.

FIG. 4 is a flow diagram illustrating a process 400 used in some implementations for adjusting the network speed to a gateway. In some implementations, process 400 is triggered by a user activating a subscription for network speed adjustment, powering on a device, a device connecting to a gateway (e.g., router), powering on the gateway, the gateway connecting to a source (e.g., ISP, cable network, satellite network, etc.), the gateway sending a token to the provisioning system, a user device sending a token to the provisioning system, or the user downloading an application on a device for adjusting network speed. In various implementations, process 400 is performed locally on the user device or performed by cloud-based device(s) that can provide/support adjusting the network speed to a gateway.

At block 402, process 400 receives a request, which includes a token, for a network speed/bandwidth increase to a gateway. A user can submit the request via an application on a user interface or via a device designated to request network speed/bandwidth increases. The gateway can send the token to the provisioning system to receive authorization for the increased network speed/bandwidth provided to the gateway. The token can include characteristics that indicate the requested network speed/bandwidth (e.g., 100 Mbps speed and/or 25 Mbps download bandwidth), duration of the increase, and time of the increase.

At block 404, process 400 measures the capacity of the network provided to the gateway (as described at block 304 of FIG. 3) and, at block 406, process 400 determines whether the system can support the network speed/bandwidth increase (as described at block 306 of FIG. 3) that is requested with the token. When process 400 determines that the system is unable to support the speed/bandwidth increase, at block 416, process 400 notifies the user that the requested increase is unavailable, and the token is returned to the user account for future usage. In some embodiments, process 400 places user requests into a priority queue according to the time the request is submitted. Process 400 can ensure that users of higher priority in the priority queue, receive priority over lower priority users when network increases are available.

When process 400 determines that the system can support the speed/bandwidth increase, at block 408, process 400 provides the increase to the gateway according to the characteristics of the token. At block 410, process 400 monitors the network usage by the gateway to identify the gateway is receiving the requested increase. The gateway can measure the network speed/bandwidth and alert the network provider if the measured network speed/bandwidth is above or below the requested increased speed/bandwidth. The gateway can measure the network speed/bandwidth to verify the network speed is the speed that the provisioning system is supposed to be providing. For example, the gateway verifies that the customer is receiving the network speed/bandwidth that they are subscribed for. If there is a difference between the measured network speed/bandwidth at the gateway and what the provisioning system is supposed to be providing, the gateway can communicate with the provisioning system to correct the network speed/bandwidth. In some cases, the gateway can communicate to the provisioning system the speed the gateway it is capable of providing to the user. The gateway can request an end-user device to execute a speed/bandwidth measurement. The gateway can send the end-user device measurement to the provisioning system.

At block 412, process 400 determines whether the network increase to the gateway has expired. For example, process 400 monitors the duration of the increase to identify when the increase expires. Process 400 can continuously or periodically monitor the increase duration until the expiration of the increase. During the increase, the application running on the user interface can display a timer or notification (audio or visual, such as a sound or blinking light) to alert the user of the time remaining for the speed/bandwidth increase.

When the increase duration has expired, at block 414, process 400 sends a notification to the user. In a first example, when a user reaches their network increase expiration, process 400 sends an alert to the user interface and/or adjusts the network speed/bandwidth to the value of the user subscription package. In a second example, when a user reaches their network increase expiration for the network, process 400 offers the opportunity for the user provide feedback regarding the increase and the ability to upgrade permanently to the increased speed. Having just experienced it, the user will have a better understanding of what the increased speed will be like for their actual use cases (e.g., video call, video gaming, etc.) and will be more likely to be satisfied with their decision. In some implementations, a user can request a decreased network speed/bandwidth to be provided to the gateway. Process 400 can provide the network speed/bandwidth decrease to the gateway for the requested duration. When the user reaches their network decrease expiration, process 400 can offer the opportunity to downgrade permanently to the decreased speed/bandwidth.

Figure 5:
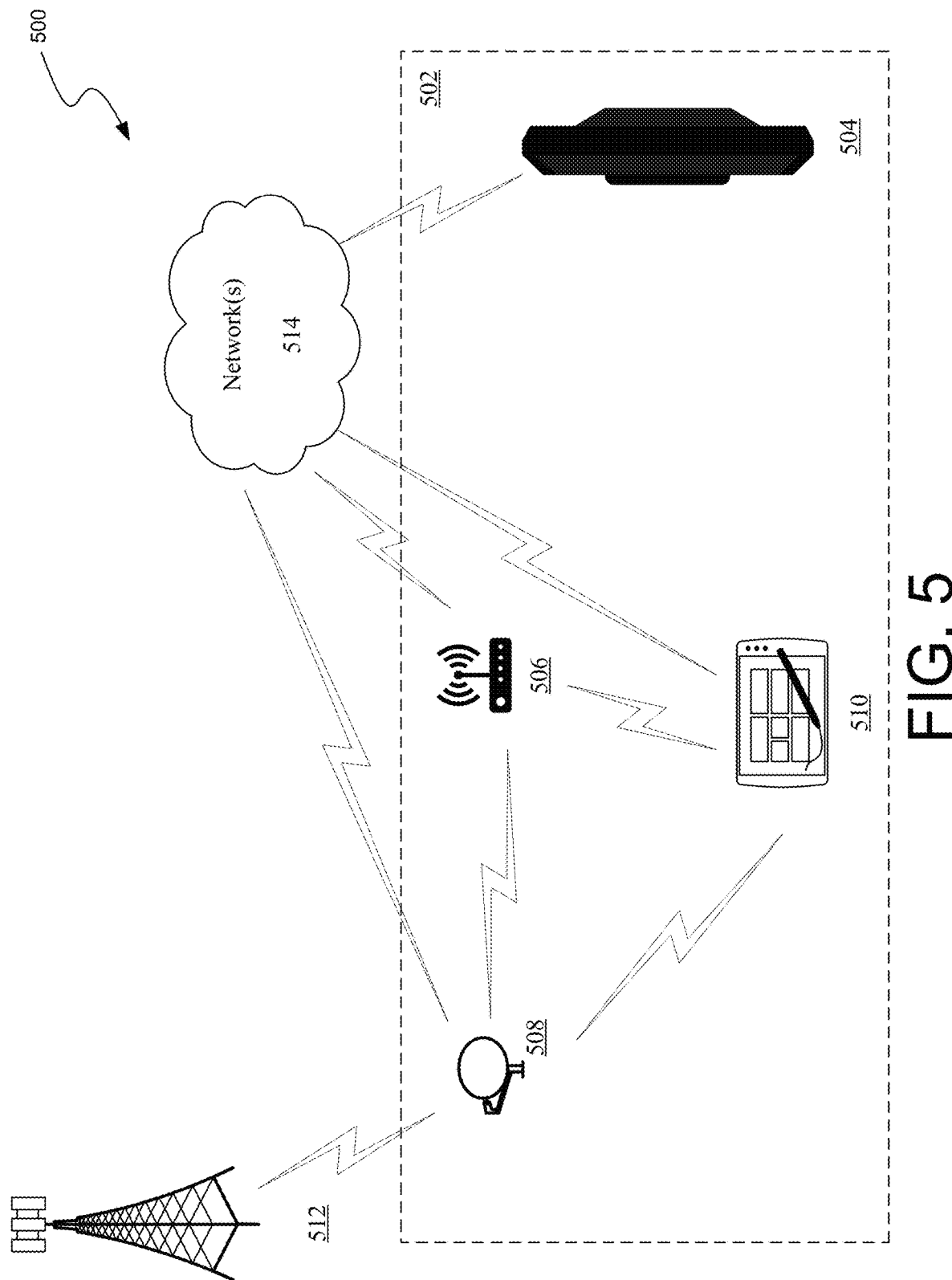
FIG. 5 illustrates an example environment of operation of the disclosed technology.

FIG. 5 illustrates an example environment of operation of the disclosed technology. In the example environment 500 illustrated in FIG. 5, area 502 may represent a house, a commercial building, an apartment, a condo, or any other type of suitable dwelling. Inside area 502 is at least one television 504, an OTA box 506 (e.g., router or broadcast module box) an OTA antenna 508, and a mobile device 510. Each of these devices may be configured to communicate with network(s) 514. OTA box 506 may be configured as a central gateway communicable with various multimedia content providers, networks, devices, and user storage sources, among other servers and databases housing content available for retrieval and display on user devices. Network(s) 514 may be a WiFi network and/or a cellular network. The OTA antenna 508 may also be configured to receive local broadcast signals from local broadcast tower 512 or satellite broadcast tower.

Figure 6:
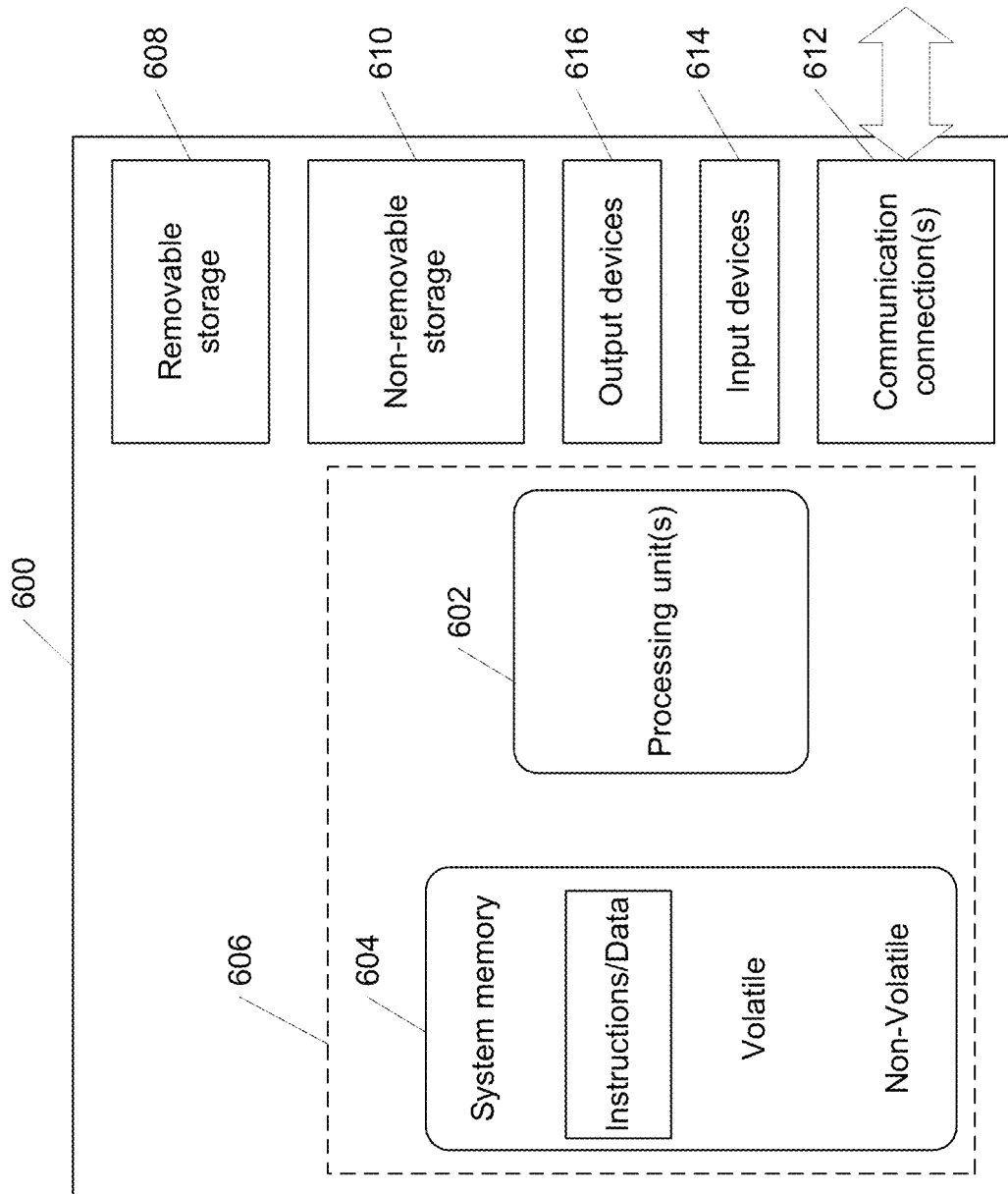
FIG. 6 illustrates one example of a suitable operating environment in which one or more of the present embodiments may be implemented.

FIG. 6 illustrates one example of a suitable operating environment in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 600 typically includes at least one processing unit 602 and memory 604. Depending on the exact configuration and type of computing device, memory 604 (storing, among other things, information related to detected devices, compression artifacts, association information, personal gateway settings, and instruction to perform the methods disclosed herein) may be volatile (such as RAM), non-volatile (such as ROM, flash memory, etc.), or some combination of the two. This most basic configuration is illustrated in FIG. 6 by dashed line 606. Further, environment 600 may also include storage devices (removable 608 and/or non-removable 610) including, but not limited to, magnetic or optical disks or tape. Similarly, environment 600 may also have input device(s) 614 such as keyboard, mouse, pen, voice input, etc., and/or output device(s) 616 such as a display, speakers, printer, etc. Also included in the environment may be one or more communication connections, 612, such as Bluetooth, WiFi, WiMax, LAN, WAN, point to point, etc.

Operating environment 600 typically includes at least some form of computer readable media. Computer readable media can be any available media that can be accessed by processing unit 602 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM EEPROM, flash memory or other memory technology, CD-ROM, digital versatile disks (DVD) or other optical storage, magnetic cassettes, magnetic tape, magnetic disk storage, or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulate data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The operating environment 600 may be a single computer (e.g., mobile computer) operating in a networked environment using logical connections to one or more remote computers. The remote computer may be a personal computer, a server, a router, a network PC, a peer device, an OTA antenna, a set-top box, or other common network node, and typically includes many or all of the elements described above as well as others not so mentioned. The logical connections may include any method supported by available communications media. Such networking environments are commonplace in offices, enterprise-wide computer networks, intranets, and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and the alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims. Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

What is claimed is:

1. A method for providing a network speed adjustment to a gateway, the method comprising:
   receiving a request for an adjustment to a network speed provided to the gateway from a first data transfer rate to a second data transfer rate,
      wherein the request includes at least one token indicating a time of usage and a duration of the adjustment to the network speed;
   in response to the request, determining that the gateway supports the second data transfer rate by:
      determining the gateway has an equipment capability to provide the second data transfer rate,
      providing a test data transfer rate to the gateway, and determining the test data transfer rate matches the second data transfer rate;
   in response to determining that the gateway supports the second data transfer rate, providing, to the gateway, network connectivity according to the second data transfer rate;
   determining that the duration of the adjustment to the network speed has reached a threshold; and
   in response to the duration reaching the threshold, providing, to the gateway, the network connectivity according to the first data transfer rate.

2. The method of claim 1, further comprising:
   determining the second data transfer rate based on a measurement of a capacity of a network providing the network connectivity to the gateway.

3. The method of claim 1, further comprising:
   determining the duration of the adjustment to the network speed based on utilization of a network and a measurement of a capacity of the network providing the network connectivity to the gateway.

4. The method of claim 1, further comprising:
   generating the at least one token to identify the second data transfer rate in the request, wherein the at least one token indicates the second data transfer rate.

5. The method of claim 1, further comprising:
   in response to the duration reaching the threshold, sending a notification to a user device regarding the adjustment to the network speed.

6. The method of claim 1, wherein the adjustment to the network speed is determined by at least one machine-learning algorithm, wherein the at least one machine-learning algorithm is trained based on at least one dataset associated with a past adjustment to network speed.

7. The method of claim 1, wherein the duration of the adjustment or the second data transfer rate is selected by a user.

8. A computing system comprising:
   one or more processors; and
   one or more memories storing instructions that, when executed by the one or more processors, cause the computing system to perform a process providing a network speed adjustment to a gateway, the process comprising:
      receiving a request for an adjustment to a network speed provided to the gateway from a first data transfer rate to a second data transfer rate,
         wherein the request includes at least one token indicating a time of usage and a duration of the adjustment to the network speed;
      in response to the request, determining that the gateway supports the second data transfer rate by:
         determining the gateway has an equipment capability to provide the second data transfer rate,
         providing a test data transfer rate to the gateway, and determining the test data transfer rate matches the second data transfer rate;
      in response to determining that the gateway supports the second data transfer rate, providing, to the gateway, network connectivity according to the second data transfer rate;
      determining that the duration of the adjustment to the network speed has reached a threshold; and
      in response to the duration reaching the threshold, providing, to the gateway, the network connectivity according to the first data transfer rate.

9. The computing system of claim 8, wherein the process further comprises:
   determining the second data transfer rate based on a measurement of a capacity of a network providing the network connectivity to the gateway.

10. The computing system of claim 8, wherein the process further comprises:
   determining the duration of the adjustment to the network speed based on utilization of a network and a measurement of a capacity of the network providing the network connectivity to the gateway.

11. The computing system of claim 8, wherein the process further comprises:

generating the at least one token to identify the second data transfer rate in the request, wherein the at least one token indicates the second data transfer rate.

12. The computing system of claim 8, wherein the process further comprises:

in response to the duration reaching the threshold, sending a notification to a user device regarding the adjustment to the network speed.

13. The computing system of claim 8, wherein the adjustment to the network speed is determined by at least one machine-learning algorithm, wherein the at least one machine-learning algorithm is trained based on at least one dataset associated with a past adjustment to network speed.

14. The computing system of claim 8, wherein the duration of the adjustment or the second data transfer rate is selected by a user.

15. A non-transitory computer-readable medium storing instructions that, when executed by a computing system, cause the computing system to perform operations for providing a network speed adjustment to a gateway, the operations comprising:

receiving a request for an adjustment to a network speed provided to the gateway from a first data transfer rate to a second data transfer rate,
wherein the request includes at least one token indicating a time of usage and a duration of the adjustment to the network speed;

in response to the request, determining that the gateway supports the second data transfer rate by:
determining the gateway has an equipment capability to provide the second data transfer rate,
providing a test data transfer rate to the gateway, and determining the test data transfer rate matches the second data transfer rate;

in response to determining that the gateway supports the second data transfer rate, providing, to the gateway, network connectivity according to the second data transfer rate;

determining that the duration of the adjustment to the network speed has reached a threshold; and in response to the duration reaching the threshold, providing, to the gateway, the network connectivity according to the first data transfer rate.

16. The non-transitory computer-readable medium of claim 15, wherein the operations further comprise:

determining the second data transfer rate based on a measurement of a capacity of a network providing the network connectivity to the gateway.

17. The non-transitory computer-readable medium of claim 15, wherein the operations further comprise:

determining the duration of the adjustment to the network speed based on utilization of a network and a measurement of a capacity of the network providing the network connectivity to the gateway.

18. The non-transitory computer-readable medium of claim 15, wherein the operations further comprise:

generating the at least one token to identify the second data transfer rate in the request, wherein the at least one token indicates the second data transfer rate.

19. The non-transitory computer-readable medium of claim 15, wherein the operations further comprise:

in response to the duration reaching the threshold, sending a notification to a user device regarding the adjustment to the network speed.

20. The non-transitory computer-readable medium of claim 15, wherein the adjustment to the network speed is determined by at least one machine-learning algorithm, wherein the at least one machine-learning algorithm is trained based on at least one dataset associated with a past adjustment to network speed.

* * * * *